United States Patent [19]

Zaltzman

[11] Patent Number: 5,048,693

[45] Date of Patent: Sep. 17, 1991

[54] METHOD AND APPARATUS FOR SORTING ARTICLES WITH SMALL DENSITY DIFFERENCES UTILIZING A FLOTATION STREAM

[75] Inventor: Arthur Zaltzman, Pocatello, Id.

[73] Assignee: World Agrosearch, Ltd.

[21] Appl. No.: 373,067

[22] Filed: Jun. 28, 1989

[51] Int. Cl.⁵ .................. B03B 5/46; B03B 5/62; B03B 11/00; B07B 4/08

[52] U.S. Cl. .................. 209/137; 209/147; 209/157; 209/173; 209/474; 209/486; 209/488; 209/492; 209/493; 209/497; 209/502

[58] Field of Search ............... 209/13, 17–20, 209/44, 133, 136–139.1, 146, 147, 149, 154–157, 162, 172, 172.5, 173, 208, 474, 475, 484–486, 500–502, 460, 488, 492, 493, 497

[56] References Cited

U.S. PATENT DOCUMENTS

| | | | |
|---|---|---|---|
| 1,068,163 | 7/1913 | Payne | 209/486 X |
| 1,178,238 | 4/1916 | Keller | |
| 1,634,898 | 7/1927 | Delamater | 209/476 |
| 1,801,195 | 4/1931 | Fraser | 209/474 |
| 1,837,299 | 12/1931 | Taggart | 209/485 X |
| 2,007,190 | 7/1935 | Fraser | 209/474 |
| 2,093,470 | 9/1937 | Morgan | 209/474 |
| 2,101,295 | 12/1937 | Rusk | 209/466 |
| 2,154,784 | 4/1939 | Stump | 209/486 |
| 2,303,367 | 12/1942 | Kendall et al. | 209/44 |
| 3,031,081 | 4/1962 | Belk | 209/173 |

(List continued on next page.)

FOREIGN PATENT DOCUMENTS

| | | | |
|---|---|---|---|
| 565956 | 12/1932 | Fed. Rep. of Germany | 209/474 |
| 2848474 | 5/1979 | Fed. Rep. of Germany | 209/474 |
| 0120697 | 8/1959 | U.S.S.R. | 209/474 |
| 946480 | 1/1964 | United Kingdom | |
| 1152611 | 5/1969 | United Kingdom | |
| 1153722 | 5/1969 | United Kingdom | |
| 1178235 | 1/1970 | United Kingdom | |
| 2078522 | 1/1982 | United Kingdom | |

OTHER PUBLICATIONS

Zaltzman, A., et al., "Separating Potatoes from Clods and Stones in a Fluidized Bed Medium," *Transactions of the ASAE*, vol. 26, No. 4, pp. 987–990 and 995 (1983).

Clarke, B., "Cleaning Seeds by Fluidization", *Journal of Agricultural Engineering Research* 31, pp. 231–242 (1985).

Zaltsman, A., et al., "Analytical Model of a Gravitational Separation Process in a Fluidized Bed Medium," *Journal of Agricultural Engineering Research* 34, pp. 257–273 (1986).

*Primary Examiner*—Donald T. Hajec
*Assistant Examiner*—Edward M. Wacyra
*Attorney, Agent, or Firm*—Workman, Nydegger & Jensen

[57] ABSTRACT

A method and apparatus for sorting articles with small density differences utilizing a flotation stream. A separator is provided in which a flotation stream continuously flows through a trough and is used to effect the separation of a mixture of articles having small density differences into several groups. Each density group of the mixture of articles to be separated is introduced at the head of the flotation stream at a selected depth. In one embodiment, the flotation stream may be comprised of a fluidized bed which is created by forcing a gas upwardly through a fluidization medium such as sand. In another embodiment of the invention, the flotation stream may be formed from a liquid. Once the mixture of articles is introduced at the selected depth into the flotation stream near the head of the stream, since the density of the flotation stream is greater than the density of the articles, the articles of lesser density begin to ascend toward the top of the flotation stream while at the same time the articles are carried downstream by virtue of the velocity of the flotation stream. Articles having a greater density will be carried further downstream whereas articles having less density will ascend to the top of the stream at a point further upstream, thereby effecting a spacial separation of the articles based on their differing densities.

56 Claims, 6 Drawing Sheets

U.S. PATENT DOCUMENTS

| | | | |
|---|---|---|---|
| 3,349,912 | 10/1967 | Eveson et al. | 209/474 |
| 3,367,501 | 2/1968 | Eveson | 209/467 |
| 3,430,764 | 3/1969 | Hensley | 209/173 X |
| 3,567,017 | 3/1971 | Hughes et al. | 209/173 X |
| 3,674,144 | 7/1972 | Muller et al. | 209/468 |
| 3,702,656 | 11/1972 | Gutterman et al. | 209/173 X |
| 3,773,175 | 11/1973 | Wallace | 209/173 |
| 3,834,927 | 9/1974 | Putney | 117/21 |
| 3,842,978 | 10/1974 | Summers | 209/469 |
| 3,984,306 | 10/1976 | Sayles et al. | 209/20 |
| 4,035,288 | 7/1977 | Gibert et al. | 209/466 |
| 4,071,304 | 1/1978 | Chauvin et al. | 427/185 |
| 4,082,655 | 4/1978 | Toledo | 209/173 |
| 4,225,424 | 9/1980 | Patzlaff | 209/3.1 |
| 4,322,287 | 3/1982 | Zaltzman | 209/44 |
| 4,375,264 | 3/1983 | Porter | 209/173 X |
| 4,466,542 | 8/1984 | Oetiker et al. | 209/44.2 |
| 4,741,443 | 5/1988 | Hanrot et al. | 209/44.1 |
| 4,861,464 | 8/1989 | Zaltzman et al. | 209/474 |
| 4,865,722 | 9/1989 | Ririe et al. | 209/474 |

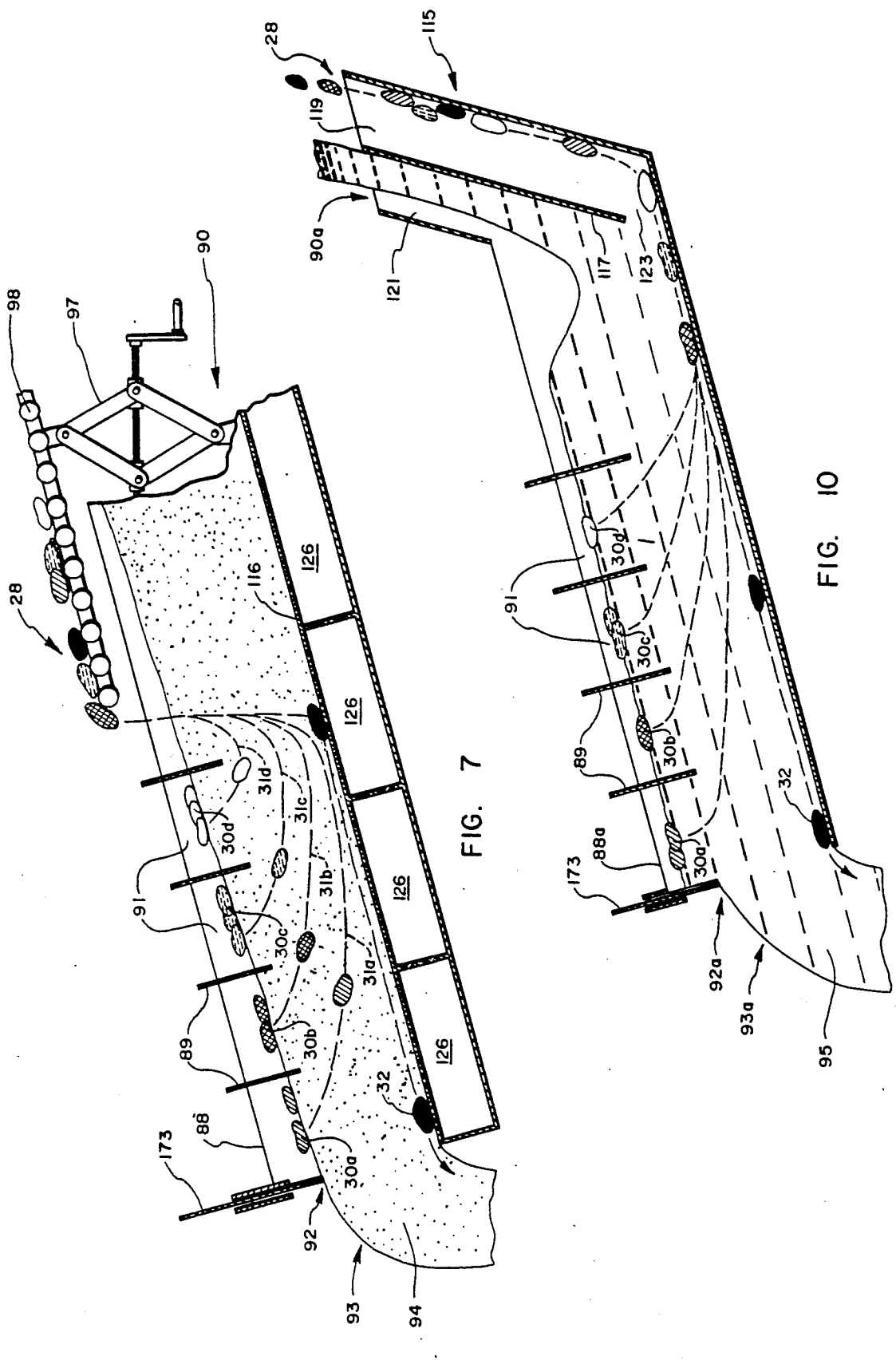

METHOD AND APPARATUS FOR SORTING ARTICLES WITH SMALL DENSITY DIFFERENCES UTILIZING A FLOTATION STREAM

BACKGROUND OF THE INVENTION

1. Field of the Invention

The present invention relates to methods and apparatus for separating mixtures of articles of different densities and more particularly to such methods and apparatus as are applicable to the sorting of articles such as, for example, agricultural or other products having small density differences into several density groups by utilizing a flotation stream.

2. Background Art

The use of density variation as a means of separating mixtures of articles is widespread. In agriculture, the separation and sorting of produce on this basis is accomplished using both wet and dry methods.

Wet methods use a liquid as a medium with which to separate denser articles, which sink in the given liquid, from the lighter ones that will float thereupon. Dry methods of sorting employ a form of pneumatic separation based on a combination of differing densities and differing aerodynamic properties associated with the components to be sorted.

In one type of dry method, a gas, such as air, is forced upwardly through a moving bed of the mixture to be separated. This gas flow through the interstices of the particles of the mixture tends to disengage the particles from each other, permitting the gas flow to support at least some of the weight thereof. As a result, the bed of the mixture resembles a liquid of high viscosity, and the particles of the mixture are freed to a degree to migrate within the bed under the influence of physical forces such as gravity that might tend to induce separation among the constituent components.

The separation that occurs when a mixture to be separated is itself fluidized is not one that results exclusively due to differing density among the components of the mixture. Instead, the aerodynamic properties of the particles of the mixture also have a substantial impact upon the rate and quality of the separation that results. The upward flow of gas through the mixture will tend to draw with it the less compact particles of the mixture, regardless of their density.

In one type of device the fluidization of such a mixture may be effected as it passes down an inclined trough. At the discharge end of the trough the mixture of the materials will become somewhat stratified according to the combined density and aerodynamic property of the component particles. Nevertheless, such a device has several inherent drawbacks which render it less than optimally desirable in relation to the broad range of circumstances in which agriculture separators of the dry variety are nevertheless desirable.

First, separators which pneumatically fluidize the actual mixture to be separated have limited separation effectiveness. While the upper and lower layers of the stratified mixture discharged from the end of the separator trough may be relatively pure, the layers intermediate thereto continue to comprise a mixture of particles of both densities. This problem is ameliorated to some degree by horizontally narrowing the separation between the vertical walls of the trough in the vicinity of its discharge end. This has the effect of increasing the depth of the flow at that point, affording more vertical distance between the separated top and bottom layers of the mixture. Still, at some point between these two extreme layers, the two materials of differing densities remain substantially intermixed in an interfaced layer. This fact precludes the achievement of optimal separation effectiveness.

A second, more profound drawback of separation methods in which the mixture to be separated is itself pneumatically fluidized arises from the fact that fluidization of the mixture is not practical if the particles of the mixture have diameters greater than approximately three or four millimeters. Thus, such methods are effective only in separating small products, such as grain cereal. They cannot be used to separate or sort large produce.

Toward that end, resort has been made to a second type of dry method which is based on the use of fluidized beds which are constituted of a material other than the mixture to be separated. For the purpose of separating mixtures of larger solid bodies of differing densities, a fluidized bed created from such a fluidization medium behaves in a manner analogous to a liquid, but without wetting the articles of the mixture it is used to separate. Pieces of solid material less dense than the apparent density of the fluidized bed will act as a "float fraction" which will float on the surface of the bed. Pieces of solid material which are more dense than the apparent density of the fluidized bed will, on the other hand, act as a "sink fraction" of the mixture which will sink to the bottom of the bed.

For separation to occur, the apparent density of the fluidized bed must be intermediate the densities of the float and sink fractions of the mixture. Additionally, the particle size of the fluidization medium must be smaller by several orders of magnitude than the size of the bodies contained in the mixture that is to be separated.

The use of a fluidization medium other than the mixture to be separated advantageously reduces the influence on the process of other separation factors, such as aerodynamic characteristics, and reduces the process to one in which separation is accomplished substantially on the basis of differing density only. In addition, the presence of a layer of fluidization medium intermediate the float fraction of the mixture on top of the fluidized bed and the sink fraction of the mixture at the bottom thereof permits a clean separation of the float and sink fractions. This is accomplished by separating the upper portion of the fluidized bed with the float fraction entrained therein from the lower portion thereof having the sink fraction entrained therein. Thereafter the two components are cleaned independently to remove any fluidization medium, and close to one hundred percent separation effectiveness between the float and sink fractions of the mixture can be achieved.

While this type of dry method works well for many applications, it still has some limitations. For example, most of the available methods, except a few wet methods, are aimed at separating products with large differences in density (such as clods and stones from potatoes, or plastic particles from copper particles, etc.). Meanwhile, a large variety of sorting applications for various types of products exists wherein the products to be sorted have only small differences in density. Mixtures of such products are commonly found, for example, in agriculture.

Most agricultural products such as fruits and vegetables do not have uniform quality and they do not uniformly mature. Postharvest quality sorting is thus required to supply reliable and uniform quality in the market place.

Some of the used techniques for quality sorting are specific to the kinds of produce for which they were developed. In addition, there are no viable methods for sorting numerous other products.

Density may be the most direct and consistent index of maturity and other quality changes. When quality changes are not manifest in external changes, such as differences in size, weight, color, etc., quality sorting with current technology is ineffective. Density may be the sole criterion to permit opportunities for quality sorting in such circumstances. However, quality sorting based on density differences has found limited success in commercial applications for several reasons.

Density changes due to quality transformations in agricultural commodities usually are very small (in the range of 0.02–0.04 $g/cm^3$). Effectively detecting and sorting products having these small differences appears to be possible only in a highly controlled density sorting process. Current density sorting techniques which use liquids such as brine solutions or solutions of alcohol in water to sort sink and float fractions require very close control of the density of such solutions so as to maintain the density intermediate that of the sink and float fractions. This is difficult, particularly as such solutions tend to become contaminated with foreign materials, which affects the solution's density. Thus, frequent changing of the solution may be required, as is preconditioning and post washing operations to reduce contamination and also to remove such liquids from the produce. These operations often deteriorate product quality and storageability. Furthermore, such liquids are expensive, and they may present fire and social hazards when used in large quantities. Some commodities such as peas and blueberries need preliminary prewetting to remove air bubbles. Others, such as peanuts, walnuts, and pecans generally can't be processed in liquids because the absorption of the liquids adversely change mealiness properties. Furthermore, sorting frequently requires grading into three or more categories, which in turn may require several liquid changes.

On the other hand, dry methods of the type noted above are generally limited to sorting mixtures of products wherein there are relatively large density differences between the float and sink fractions. When differences in densities of the products to be sorted are small, such as in the range of differences on the order of 0.02 $g/cm^3$, the density of the fluidized bed, which as noted must be intermediate the sink and float fractions, should differ by only 0.01 $g\ cm^3$ from the densities of the products. Maintaining a fluidized bed within such parameters is technically difficult to achieve. Accordingly, what is needed is a method and apparatus for sorting articles with small density differences which can be implemented utilizing either wet or dry fluidized bed techniques and which eliminates many of the above-noted difficulties. Such an apparatus and method are described and claimed herein.

SUMMARY OF THE INVENTION

In view of the present state of the art, one object of the present invention is to provide an improved method and apparatus for efficiently separating and sorting a mixture of articles, as for example agricultural products, when the articles are to be sorted into several different groups based on small density differences.

Another object of the invention is to provide an improved method and apparatus for sorting articles of small density differences into several groups utilizing a flotation stream that can be implemented in either a wet or a dry process.

A further object is to provide a method and apparatus wherein the primary density requirement of the flotation stream which is utilized for separation of a mixture of articles having small density differences is that the flotation stream have a density which is greater than the heaviest density of the float fraction articles contained in the mixture.

Still another object of the present invention is to provide a method and apparatus for sorting articles with small density differences into several groups which is versatile and simple to use and which permits adjustment of the method and the corresponding apparatus by which the method is implemented in order to intensify the degree of separation of such articles by adjustment of any of several parameters, including fluid velocity of the flotation stream (either uniformly or in step-wise fashion from the top of the stream to the bottom of the stream), or by adjusting the depth at which the articles are introduced into the flotation stream.

The foregoing and other objects and advantages of the invention will become more apparent from the following detailed description, or may be learned by the practice of the invention. In accordance with the invention as embodied and broadly described herein, a separator is provided in which a flotation stream continuously flows through a trough and is used to effect the separation of a mixture of float fraction articles having small density differences into several groups.

Each density group contained in the mixture of articles to be separated is introduced at the head of the flotation stream at a selected depth, for example, by dropping the mixture of articles into the stream from a predetermined height, or by introducing the entire mixture of articles into the stream at the same selected depth, as for example through a chute which has an outlet that opens into the flotation stream at the selected depth. In one embodiment of the invention the flotation stream may be, for example, a fluidized bed of the type which is created by forcing a gas such as air upwardly through a moving bed of fluidization medium such as sand as the sand flows through the trough. In another embodiment of the invention, the flotation stream may be formed from a liquid. In either case, the velocity of the flotation stream may be adjustably controlled and the density of the flotation stream is maintained at an essentially uniform value which is greater than the density of any of the float fraction articles.

In accordance with the method and apparatus of the invention, once the mixture of articles is introduced at the selected depth for each density group into the flotation stream near the head of the stream, to the extent that the density of the flotation stream is greater than the density of the articles, the articles of lesser density (e.g., the float fraction) will begin to ascend toward the top of the flotation stream while at the same time the articles are carried down stream by virtue of the velocity of the flotation stream. The time of ascension will vary based on the differing densities of the float fraction articles contained in the mixture to be separated. Accordingly, float fraction articles having a greater density will be carried further downstream whereas float fraction articles within the mixture having less density will ascend to the top of the stream at a point further upstream than the more dense articles, thereby affecting a spacial separation of the float fraction articles based on their differing densities.

To the extent that articles are contained with the mixture which have a density greater then that of the flotation stream, those articles will tend to act as a sink fraction which will not ascend toward the top of the stream. Accordingly, separation of the mixture into various groups may result not only based on the fact that the mixture contains sink and float fractions, but importantly, with respect to the float fraction of the mixture which ascends to the top of the stream, there will also be a spacial separation into various groups based only on the differing densities of those groups. Advantageously, this method and apparatus will permit effective separation of the mixture of articles, even though the articles have only very small density differences, as for example, where the differences are on the order of 0.02 g/cm$^3$, and eliminates the need in many cases for maintaining the density of the flotation stream at an intermediate value.

By increasing the velocity of the flotation stream the degree of spacial separation affected as the articles ascend to the top of the stream can be increased, or in the alternative, the same result can be obtained by introducing the articles into the flotation stream at a greater depth, as for example by dropping them at a greater height into the head of the stream. Baffles can also be placed at the top of the stream to assist in the separation of the various groups and also to form compartments from which the sorted groups may be discharged from the flotation stream.

BRIEF DESCRIPTION OF THE DRAWINGS

A more particular description of the invention briefly summarized above will be rendered by reference to the specific embodiments thereof which are illustrated in the appended drawings, in which like parts are designated by like numerals. Understanding that these drawings depict only typical embodiments of the invention as represented, for example, by the currently understood best mode for practicing the invention, the drawings are therefore not to be considered limiting of its scope. The invention will thus be described with additional specificity and detail through the use of the following drawings in which:

FIG. 6 is a detailed perspective view of an alternate embodiment of the restriction means of the present invention;

FIG. 7 is a schematic illustration which depicts one method in which the teachings of the present invention may be implemented in a separator utilizing a flotation stream formed from a fluidized bed;

FIG. 10 is a schematic illustration of another embodiment of a separator incorporating the teachings of the present invention, depicting utilization of a flotation stream formed from a liquid and also showing an alternative method for introducing the mixture of articles into the flotation stream.

DESCRIPTION OF THE PREFERRED EMBODIMENTS

Figure 1:
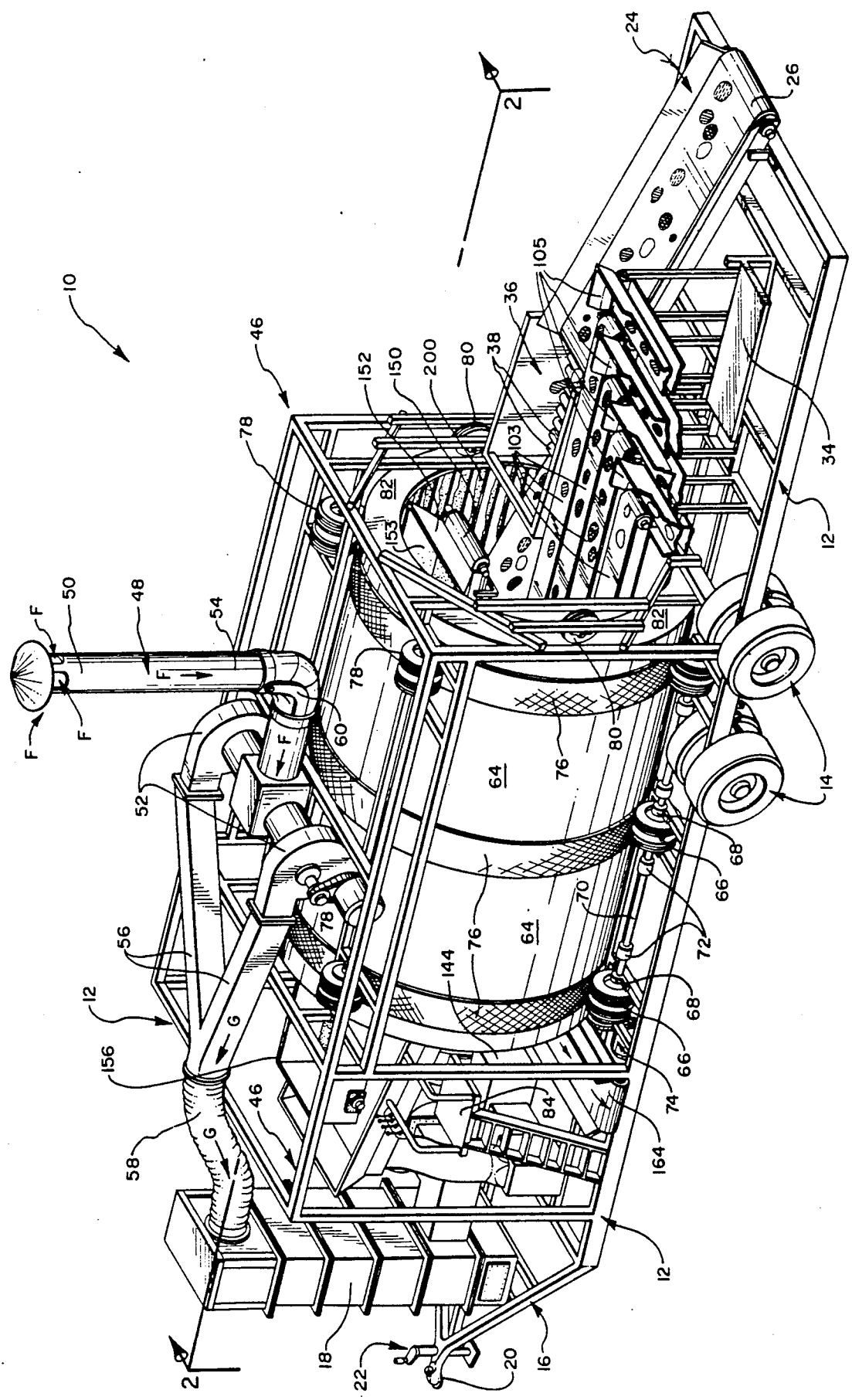
FIG. 1 is a perspective view of one embodiment of a separator incorporating the teachings of the present invention.

One presently preferred embodiment of a separator incorporating the teachings of the present invention may be understood by reference to FIG. 1. There a fluidized bed separator generally designated at 10 can be seen to comprise a frame generally designated at 12 and supported and rendered mobile on tires 14.

One end of frame 12 terminates in a cantilevered triangular platform generally designated at 16 upon which is supported a columnar enclosure 18, the function of which will be explained below. The apex of triangular support platform 16 remote from separator 10 includes a hitching mechanism 20 by which separator 10 may be attached to a vehicle and drawn from one work site to another on tires 14. For convenience the end of separator 10 that includes triangular support platform 16 will be referred to hereinafter as the "front end" of separator 10, as it precedes the other portions thereof when separator 10 is being towed by a vehicle. Adjacent hitching mechanism 20, frame 12 also includes an adjustable footing generally designated at 22 for supporting the front end of separator 10 and leveling frame 12 when hitching mechanism 20 is not connected to a towing vehicle.

The end of separator 10 opposite from the front end thereof terminates in a cantilevered rectangular support invention, separator 10 comprises a mixture feed means for supplying a mixture of articles to be separated to a channelization means, as described further below. In the illustrated embodiment, the mixture feed means is comprised in part of a mixture receiving conveyor 26 which receives mixtures of articles to be processed by separator 10 and advances the mixture in the direction indicated by arrow A. For the sake of simplicity the power source and drive mechanism for mixture receiving conveyor 26, and other conveyors presently to be described, have not been depicted in the figures. Similarly, some supporting structure, such as frames, braces, and adjustment mechanisms for various functional components of separator 10 have been eliminated to simplify the drawing.

A typical mixture 28 (see FIGS. 2 and 7) for processing by separator 10 is received on mixture receiving conveyor 26. Mixture 28 includes a float fraction 30 of articles 30a–30d having small density differences but all of which are less than the density of the flotation stream. Mixture 28 may also contain a sink fraction 32 of articles having a density that is greater than that of the flotation stream. The various articles 30, 32 of mixture 28 are preferably sized before being introduced onto receiving conveyor 26 so that the articles 30, 32 are generally of a uniform size. Sizing can be accomplished using a variety of methods and devices which are known in the art. One example of such a device is illustrated and described in U.S. Pat. No. 4,627,541, incorporated herein by reference.

Adjacent mixture receiving conveyor 26 and supported on rectangular support frame 24 is a section of flooring 34 upon which a worker may stand and, by observing mixture 28 passing on mixture receiving conveyor 26, remove therefrom any articles not properly sized or otherwise obviously defective.

The articles 30, 32 on mixture receiving conveyor 26 arrive in a cleaning enclosure generally designated at 36 for gentle agitation and advancement in the direction indicated by arrow B on a floor of individually driven spaced-apart cleaning rollers 38. Cleaning rollers 38, which also comprise part of the mixture feed means, may each advantageously be provided in a known manner with a plurality of short radially extending paddle-like projections which lift and tumble the articles of mixture 28 as cleaning rollers 38 are rotated. This initial processing of mixture 28 permits fine contaminants, such as sand, gravel, and dust, which would otherwise form a part of sink fraction 32 of mixture 28, to fall downwardly out of cleaning enclosure 36 through the separations between adjacent cleaning rollers 38, where they come to rest and are carried away by a particle conveyor (not shown for purposes of simplifying the drawing). The preliminary cleaning of mixture 28 to remove fine contaminants thus reduces the amount of fine dust that eventually becomes mixed with the flotation stream employed in separator 10.

In addition to supporting the mechanisms which effect the above-described preliminary cleaning, rectangular support platform 24 upholds other conveyors which will be described presently. For convenience the end of separator 10 that includes rectangular support platform 24 will be referred to hereinafter as the "back end" of separator 10, as it follows the other portions thereof when separator 10 is being towed by a vehicle.

Referring still to FIG. 1, it can be seen that frame 12 between triangular support platform 16 at the front end of separator 10 and rectangular support platform 24 at the back end thereof is formed into a box-like framework designated at 46 within which the actual separation of mixture 28 is effected using fluidized bed principles.

Extending a substantial distance above the top of box-like framework 46 is an air intake stack designated at 48 through which to draw ambient air into the pneumatic system of separator 10. The height of open upper end 50 of air intake stack 48 enables air blowers 52 communicating with the bottom end 54 thereof to draw air in the direction shown by arrows F into that pneumatic system which is relatively free of dust generated by separator 10 itself. Air from air blowers 52 passes through ducting 56 and flexible piping 58 to columnar enclosure 18 as shown by arrows G.

Further processing of the air utilized in the pneumatic system of separator 10 will be described subsequently, but it should be noted that the placement of air blowers 52 at the intake end of the pneumatic system of separator 10 causes all air passing therein, with the exception only of air moving through air intake stack 48, to be in a state of positive pressure. This advantageously precludes entry into the pneumatic system of airborne dust at any point downstream from air blowers 52. Accordingly, pneumatic systems passageways, such as ducting 56 and flexible piping 58, need not be absolutely air tight in order to preserve the purity of the air therein. Any cracks or small openings in such passageways will inherently permit the escape of air outflow from the pneumatic system. To facilitate the transportation of separator 10 and to reduce the chance of wind damage to air intake stack 48 when separator 10 is not in use, the bottom 54 of air intake stack 48 is provided with a hinge mechanism 60 which permits air intake stack 48 to be lowered against the top of box-like framework 46 as shown by the dashed lines in FIG. 2.

The space interior to box-like framework 46 toward the back end of separator 10 is occupied by a medium recirculation means for supplying fluidization medium collected at an output of the channelization means back to the input thereof. By way of example, the medium recirculation means is comprised of a horizontally disposed recirculation drum 64 supported for rotation about the longitudinal axis thereof on several pairs of drive wheels 66 mounted in bearings 68 on each side of recirculation drum 64, together with the additional structure described below which together with drum 64 provide the stated function of the medium recirculation means.

The axles of drive wheels 66 on each side of recirculation drum 64 are interconnected by shafts 70 and chain couplings 72. In this manner all drive wheels 66 on one side of recirculation drum 64 will flexibly support the weight thereof and nevertheless be driven together by a single hydraulic motor 74 in order to rotate recirculation drum 64. The two hydraulic motors 74 on each side of recirculation drum 64 are connected in parallel with each other and powered by a single conventional hydraulic pump (not shown), and together serve as a drive means for turning each of the drive wheels 66 in a common direction to rotate the recirculation drum 64. This arrangement permits variation in the speed at which recirculation drum 64 is rotated and automatically compensates for the uneven loading of the two sides of recirculation drum 64 which is encountered in normal operation of separator 10.

To enhance the traction between drive wheels 66 and recirculation drum 64, the exterior of the latter is provided at the portions bearing against drive wheels 66 with traction track 76. Recirculation drum 64 is retained in position supported on drive wheel 66 by sets of idler wheels 78 which contact the outer surface of recirculation drum 64 above and on each side of the longitudinal axis thereof at traction tracks 76. Longitudinal displacement of recirculation drum 64 is precluded by bearing wheels 80 thereof which engage lateral annular end surfaces 82 at each end of recirculation drum 64. For the purpose of separator 10, recirculation drum 64 is rendered capable of rotation at a speed of from zero to six revolutions per minute, and typically at about four revolutions per minute.

Figure 2:
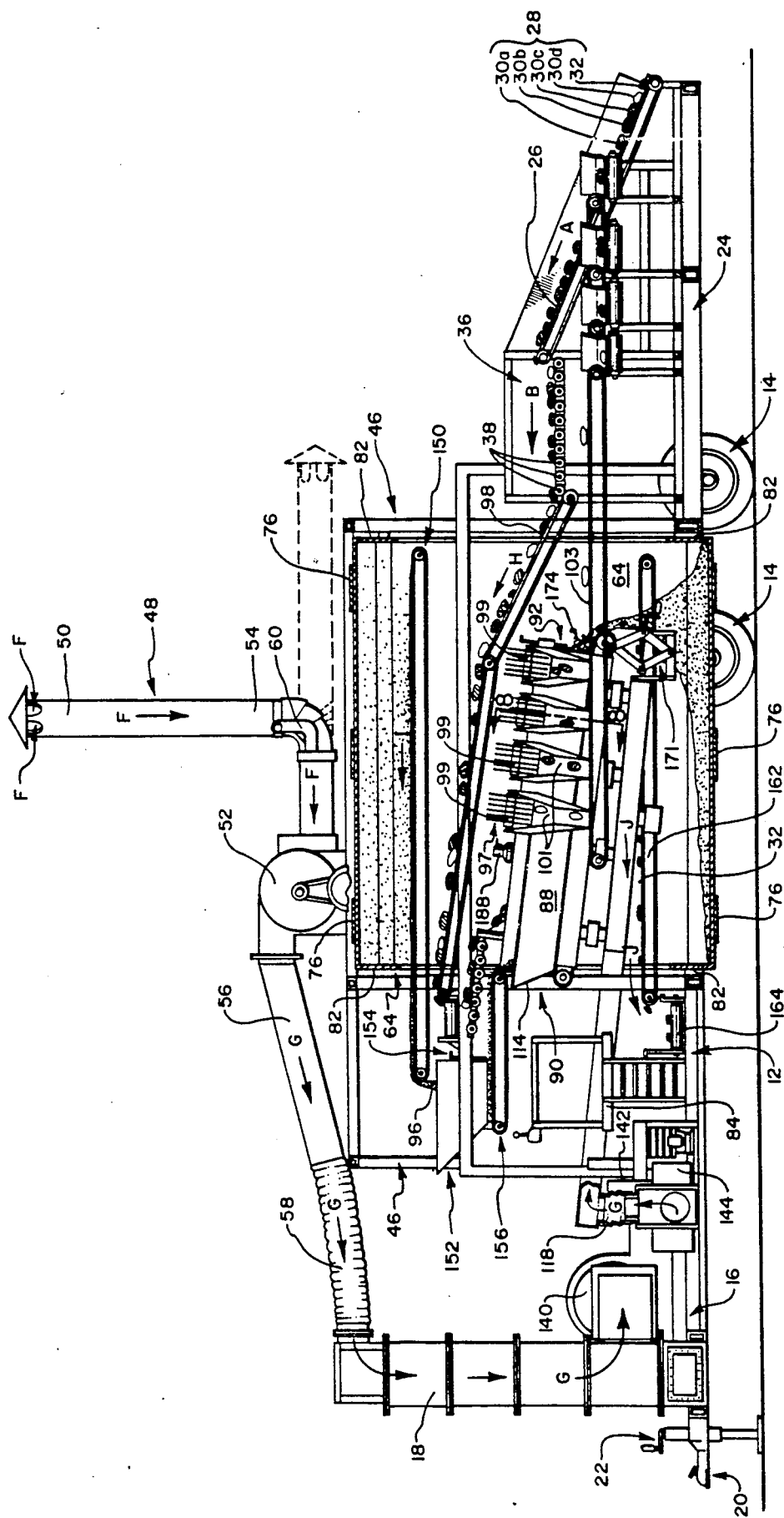
FIG. 2 is an elevation view in partial cross-section of the embodiment of the separator illustrated in FIG. 1 taken along section line 2—2 shown therein.
Figure 3:
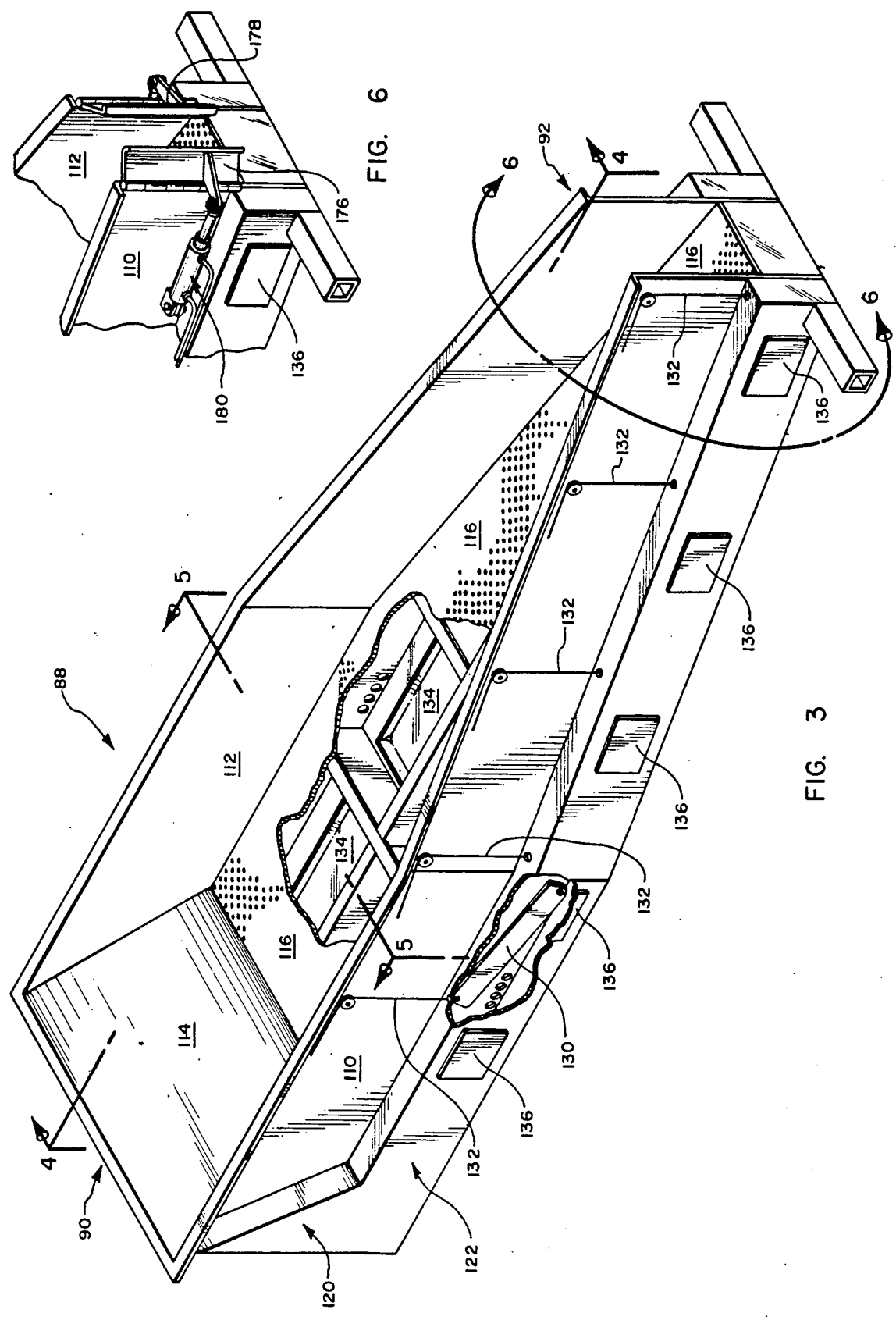
FIG. 3 is a perspective view of the trough of the separator of FIG. 2, with portions thereof shown cutaway to reveal further detail.

The interior surface of recirculation drum 64 is provided with a continuous plurality of transport pockets 200 (see FIG. 1). As seen in FIGS. 1 and 2 taken together, fluidization medium 96 emerging from output end 92 of trough 88 falls to the bottom of recirculation drum 64 filling transport pockets 200. By means of rotation recirculation drum 64 lifts the fluidization medium 96 upwardly for unloading into hopper 152. Hopper 152 in combination with feed conveyor 150 functions as a medium translation means for receiving fluidization medium 96 unloaded from transport pockets 200 and transferring such fluidization medium 96 to input end 90 of trough 88.

Use of a recirculation means such as that of the present invention results in a sorter 10 which is shorter laterally by approximately 30% than a sorter employing conventional conveyors to lift fluidization medium back into the channelization means of the apparatus. In addition, recirculation drum 64 provides a cover protecting the fluidization medium therein from water, such as rain and dew, when the device is not in use. As substantially all separating and cleaning occurs within recirculation drum 64 the dispersal of dust from that process is substantially reduced by the enclosure afforded by recirculation drum 64. Such a recirculation means has also been found to require less fluidization medium than corresponding known fluidized bed separators. Further details of the recirculation drum are illustrated and described in U.S. patent application Ser. No. 092,030 filed Sept. 1, 1987, now U.S. Pat. No. 4,865,722, incorporated herein by reference.

The space within box-like framework 46 at the front end of separator 10 encloses an operator control platform 84 from which vantage point the functioning of separator 10 can be observed and controlled. Other equipment is enclosed in box-like framework 46 but will be described in relation to other of the figures.

As best understood in relation to FIG. 2, separator 10 includes a channelization means for establishing a bed through which the flotation stream continuously flows. In the illustrated embodiment, the channelization means is in the form of an inclined trough 88 having an elevated input end 90 and an output end 92. Trough 88 contains a fluidized bed 94, enabling it to flow under the influence of gravity from input end 90 to output end 92. Fluidization bed 94 is comprised of a fluidization medium 96, such as sand, which is supplied to input end 90 of trough 88 in the manner to be described above. Mixture 28 from cleaning enclosure 36 is transported upon mixture conveyor 98, which further comprises part of the mixture feed means, in the direction shown by arrow H also to input end 90 of trough 88 for entrainment in fluidized bed 94.

The creation of fluidized bed 94 from fluidization medium 96 occurs as a result of forcing air upwardly through the fluidization medium 96 in trough 88 by a pneumatic means better understood in relation to FIGS. 3, 4, 5, and 5A taken together. As seen therein, trough 88 includes sidewalls 110, 112 which narrow toward output end 92 of trough 88. Input end 90 of trough 88 is formed into an inclined end wall 114. The bottom of trough 88 comprises an air distribution plate 116 which may be a high density perforated polyethylene plate or porous metal sheet. For the purposes of separator 10, a gas distribution plate 116 having an average opening of 30 microns and a flow rate of 50 standard cubic feet per minute has proven satisfactory. Ultimately, ambient air taken in through intake stack 48 (see FIG. 2) and pretreated in a manner to be described in detail hereafter is directed through air distribution plate 116 and forced upwardly through the layer of fluidization medium 96 supported in trough 88.

Figure 4:
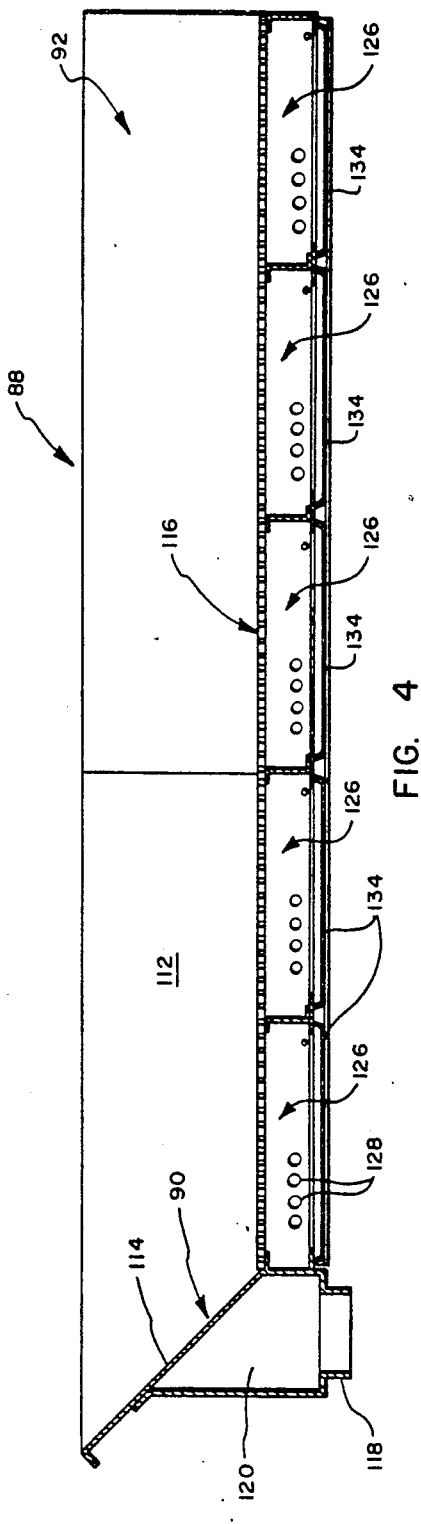
FIG. 4 is a cross-sectional elevational view of the trough of FIG. 3 taken along section line 4—4 shown therein.
Figure 5A:
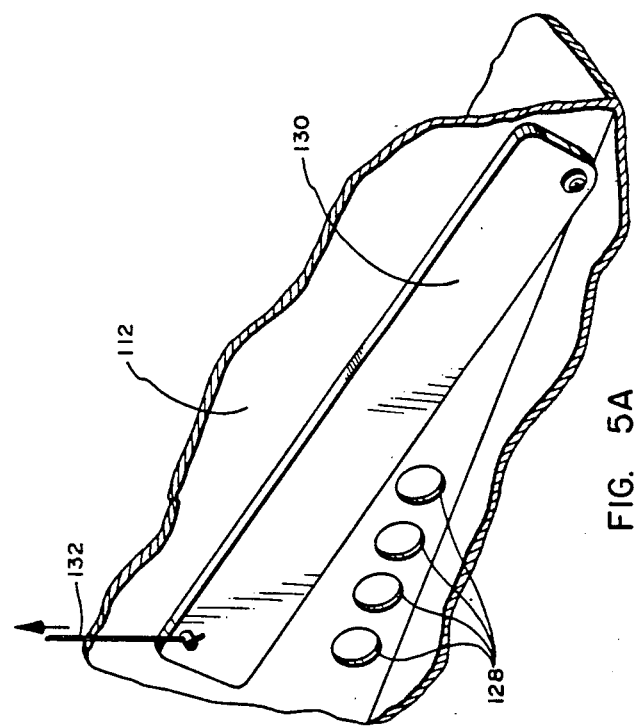
FIG. 5 is a transverse cross-sectional view of the trough of FIG. 3 taken along section line 5—5 shown therein.
Figure 5:
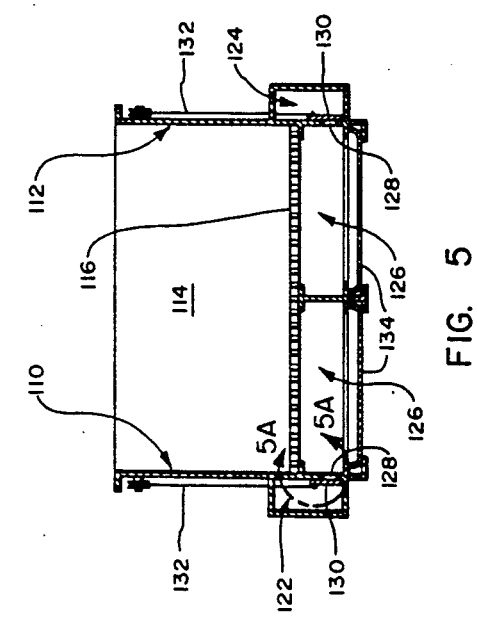

Air for this purpose enters a series of chambers 126 (see FIG. 4) below trough 88 and air distribution plate 116 through an orifice 118 shown in FIGS. 4 and 5 in the bottom wall of an air receiving chamber 120 beneath inclined end wall 114. The air then divides and passes on either side of trough 88 through rectangular air plenums 122, 124 which extend the full length of trough 88 on opposite sides thereof (see FIG. 5). Below air distribution plate 116 are a series of gas pressure chambers 126 which each open into one or the other of air plenums 122, 124 through a plurality of circular air intake openings 128. Air under pressure in air plenums 122, 124 thus passes through air intake openings 128 into gas pressure chambers 126 and is forced upwardly through air distribution plate 116 and fluidization medium 96 thereabove to create fluidized bed 94.

Each set of air intake openings 128 is adjustably occludable by a pivoted air pressure control plate 130 (see FIG. 3) which may be raised and lowered by a control cable 132 attached to one end thereof. Ultimately such occlusion impacts the effective density of fluidized bed 94 above each individual air pressure chamber 126. Partially covering intake openings 128 by lowering the pressure control plate 130 reduces the air pressure in the associated air pressure chamber 126 in relation to that existing in air plenums 122, 124. Thus, air intake openings 128 in combination with air pressure control plates 130 serve as air pressure reducing valves for each of air pressure chambers 126.

The narrowing of sidewalls 110, 112 toward the output end 92 of trough 88 causes the depth of fluidized bed 94 to increase in the direction of its flow. Nevertheless, it may be desirable for optimally efficient separation of mixture 28 into its consistent groups that the effective density of fluidized bed 94 be held essentially constant, regardless of any variation in its depth, particularly if mixture 28 includes a sink fraction 32. Increasing the depth of the fluidized bed 94 also enhances separation of any sink fraction 32.

A shallow fluidized bed requires less air flow to achieve the same effective density than does a deeper one. Decreased air flow in the shallower portions of fluidized bed 94 is therefore utilized to maintain a uniform density therein. The air pressure in each of air pressure chambers 126 immediately below air distribution plate 116 is individually adjusted toward that end by manipulating air pressure plates 130. The air in air pressure chambers 126 is thereby graduated so that the pressure of the air in each decreases corresponding to the distance of each air pressure chamber 126 along distribution plate 116 from output end 92 of trough 88. This adjustment of air pressure is intended to correspond roughly to the variation in the depth of fluidized bed 94 along the length of trough 88.

Control cables 132 for manipulation of air control plate 130 terminate at control platform 84 (see FIG. 1) to permit portion of each gas pressure chamber 126 is provided with a cleanout hatch 134 to facilitate maintenance, while the outer walls of air plenums 122, 124 at each air pressure control plate 130 are provided with access hatches 136 to permit servicing of the pneumatic system at those locations.

In accordance with one aspect of the present invention, air pretreatment means are provided for producing from ambient air conditioned air suitable for creating a fluidized bed from fluidization medium 96 and for supplying such conditioned air to the pneumatic means described above. As used herein, the expression "suitable for creating a fluidized bed" when used in reference to conditioned air in the pneumatic system of separator 10 refers to ambient air which has been subjected to any of the following treatments singly or in combination: (1) removal of particles exceeding a predetermined particle size which could tend to clog the holes in air distribution plate 116, (2) heating to a temperature adequately elevated to remove moisture from fluidized bed 94, (3) initial collection for the pneumatic system at a substantial distance above box-like framework 46 to avoid drawing in therewith dust created by the operation of separator 10, or (4) maintenance under positive pressure to prevent unwanted entry into the pneumatic or air pretreatment means of dust in the ambient air external thereto. The air pretreatment means of separator 10 is thus comprised of any combination of the specific structures, described further below, which provide these functions.

As shown by way of example and not limitation, and as discussed earlier in reference to FIGS. 1 and 2, air intake stack 48 permits the collection of ambient air at a height above box-like framework 46 which minimizes the intake of dust created by the operation of separator 10. Air blowers 52 keep air downstream therefrom under a state of positive pressure so as to prevent the entry of dust. Columnar enclosure 18 houses air filters designed for removing large volumes of fine dust as small as 3.0 microns. Doing so reduces clogging of air distribution plate 116. Suitable air filters for this purpose include the FT-40 and FT-140 cloth air filters manufactured by Dustkop.

Following treatment in columnar enclosure 18, air for the pneumatic means for separator 10 passes through secondary air blowers 140 and 142, as shown in FIG. 2. These operate in series to provide air under positive pressure to an air heater 144 which heats the air prior to its passage through orifice 118 into the pneumatic means of separator 10. A conventional air heater with a 350,000 BTU capacity will serve adequately as air heater 114.

As shown in FIG. 2, fluidization medium 96 is provided to input end 90 of trough 88 on an overhead feed conveyor 150 at the bottom of an elongated hopper 152. Hopper 152 is disposed above trough 88 extending at least the full length of recirculation drum 64. Feed conveyor 150 moves fluidization medium 96 in the direction of input end 90 of trough 88 as shown by arrow I, and in the illustrated embodiment hopper 152 and conveyor 150 thus serve as a medium translation means for receiving fluidization medium unloaded from recirculation drum 64 and for then transferring the fluidization medium to the trough 88.

At the end of hopper 152 closest to input end 90 of trough 88 is a metering means for regulating the rate at which fluidization medium is supplied to the channelization means, shown by way of illustration as a metering gate 154. By its movement up or down, metering gate 154 regulates the rate at which fluidization medium 96 is withdrawn from hopper 152 and supplied to input end 90 of trough 88 by conveyor 156. Conveyor 156 is at least as wide as input end 90 of trough 88, and the lateral extent of fluidization medium 96 withdrawn from hopper 152 through metering gate 154 on conveyor 156 is substantially equal to the width of input end 90 of trough 88. In this manner as fluidization medium 96 falls from the end of conveyor 156 adjacent input end 90 of trough 88, it impacts inclined end wall 114 of trough 88 in a uniform quantity. This advantageously contributes to the establishment of fluidized bed 94 early in the passage of fluidization medium 96 through trough 88.

With reference again to FIG. 2, as sink fraction 32 of mixture 28 exits trough 88 it comes to rest on a first sink fraction conveyor 162 which moves the articles of sink fraction 32 in the direction indicated by arrow J for discharge onto a second sink fraction conveyor 164.

It has been found that for some combinations of proportions (e.g., narrowing of the trough, length etc.) and for some degrees of inclinations of a channelization means, such as trough 88, the establishment of an adequately deep fluidized bed 94 does not occur. Thus, in accordance with the present invention a fluidized bed separator, such as separator 10, is provided with restriction means for assisting the establishment of fluidized bed 94 by temporarily retarding the flow of fluidized bed 94 at output end 92 of trough 88 without substantially changing the volume of trough 88.

As shown herein by way of example and not limitation an obstruction is provided which is selectively interposable into the flow of fluidized bed 94 at output end 92 of trough 88. In one embodiment of the restriction means of the present invention shown in FIG. 2, such an obstruction takes the form of a damper plate 174 pivotally mounted about a horizontal axis at output end 92 of trough 88. To enable the establishment of fluidized bed 94, damper plate 174 is pivoted to the position shown by the dashed lines in FIG. 2. The additional resistance to the outflow of fluidized bed 94 from output end 90 of trough 88 caused fluidized bed 94 to rise. Once an acceptable depth is achieved, damper plate 174 is pivoted to mitigate or eliminate totally such restriction to flow.

Damper 174 should not extend to air distribution plate 116 so as to totally restrict the portion of fluidized bed 94 acting upon sink fraction 32. Doing so may cause an accumulation of articles in sink fraction 32 on the bottom trough 88 which is too substantial for the flow of fluidization medium 96 to clear therefrom, even when damper plate 174 is moved into a nonrestricting position.

Alternatively, the restricting means of the present invention can take the form of a plurality of damper plates, or a damper plate or plates that are vertically movable, such as plate 173 in FIGS. 7 and 10. Another example of an alternative restriction means is shown in FIG. 6 as comprising damper plates 176, 178 which are mounted to sidewalls 110, 112, respectively, of trough 88 at output end 92 thereof. Damper plates 176, 178 are pivotable about a vertical axis and actuable, for example, by hydraulic or electrical controls 180. It is also important that damper plates 176, 178 not be extensive enough to completely close off output end 92 of trough 88, for the same reason already mentioned.

Once established, it is desirable to maintain fluidized bed 94 at an essentially constant depth. This stability, however, is repeatedly disrupted through the addition to fluidized bed 94 of mixture 28 from mixture conveyor 98. In accordance with the present invention, control means are thus provided for sensing the depth of fluidized bed 94 and based thereon for controlling the rate at which feed conveyor 150 supplies fluidization medium 96 to input end 90 of trough 88. In this manner the depth of fluidized bed 94 can be maintained automatically at a preselected value. As shown by way of example and not limitation, one form of such a control means can take the form of an ultrasonic sensor 188 mounted above trough 88 to detect the distance of the top surface of fluidized bed 94 therefrom. Cylindrical ultrasonic proximity sensors, such as those among the Series PCU Ultrasonic Proximity Sensors marketed by Agastat Corporation, will function adequately for this purpose. Signals from ultrasonic sensor 188 then are used to control the drive means employed in relation to feed conveyor 150.

The operation of fluidized bed 94 to separate the articles 30, 32 of mixture 28 is best understood in relation to FIG. 7. Mixture 28 supplied on mixture conveyor 98 to input end 90 of trough 88 is dropped into a flotation stream 93. In the above-described embodiment, the flotation stream 93 is formed from a fluidization medium, such as sand, from which a fluidized bed 94 is created in the heretofore described manner. The mixture 28 is comprised of a float fraction 30 of articles which have slightly differing densities as represented at 30a–30d. The mixture 28 may also be comprised of a sink fraction 32, although the inventive method and apparatus of the invention can be used equally well with a mixture 28 which does not include a sink fraction 32.

Preferably, the density of the flotation stream 93 is maintained at an essentially uniform value. If the mixture 28 includes a sink fraction 32, the density of flotation stream 93 must be maintained intermediate the float and sink fractions 30, 32. However, if mixture 28 does not include a sink fraction 32 the flotation stream 93 can simply be maintained at a density which is greater than the heaviest density of any of the articles 30a–30d of the float fraction, as for example, article 30a.

Each density group 30a–30d of mixture 28 is introduced into the flotation stream 93 at the head of the stream at a depth which is selected in combination with the velocity of the flotation stream so as to permit adequate spacial separation of the various articles 30a–30d of the float fraction, in the manner further described below. Accordingly, the mixture conveyor 98 is preferably designed so that it can be selectively raised or lowered using any well-known method in the art, such as by the mechanism 97, so as to be able to adjust the depth at which the articles are introduced into the flotation stream. As will be appreciated, by adjusting the height from which mixture 28 is dropped into the flotation stream 93, each density group of articles 30a–30d will descend into the flotation stream 93 to a greater depth, which marks the beginning of the ascension of the articles as shown by dashed lines 31a–31d.

The velocity of the flotation stream 93 can also be selectively adjusted, for example by increasing or decreasing the angle of inclination of the trough 88 using the mechanism 171 (see FIG. 2) and/or by restricting the outlet end 92 of trough 88 using vertically adjustable gate 173 or damper 174 (or damper plates 176, 178) so as to retard the flow of flotation stream 93 to either a greater or lesser degree. By increasing the depth at which the articles are introduced into the stream, and/or by increasing the stream's velocity, or by a combination of both, the degree of separation effected can be controlled.

As the articles 30a–30d of the float fraction begin to ascend to the top of the flotation stream 93, they are also carried downstream to a distance based on the velocity of flotation stream 93 and the initial depth of entry into the stream. Those articles, as for example articles 30d which are less dense, will descend less and will also have a corresponding rate of ascension which is faster than articles such as articles 30a–30c which have a progressively greater density. Accordingly, those articles having a greater density will be carried further downstream depending upon the depth at which the articles were initially introduced into the flotation stream and depending upon the velocity of the flotation stream, thereby effecting a spacial separation into groups as 7 as various of articles illustrated in FIG. 7 the flotation fraction reaches the top of the stream.

Baffle means can optionally be provided for assisting in collection and separation of the float fraction articles 30a–30d into their various groups as the float fraction articles reach the top of the flotation stream. As illustrated in FIG. 7, the baffle means may be comprised of a series of simple vertical dividers 89 which consist of screens that are permeable with respect to the stream 93, and which help to divide the top of the flotation stream into various compartments 91 where the differing groups of articles are collected.

Figure 8:
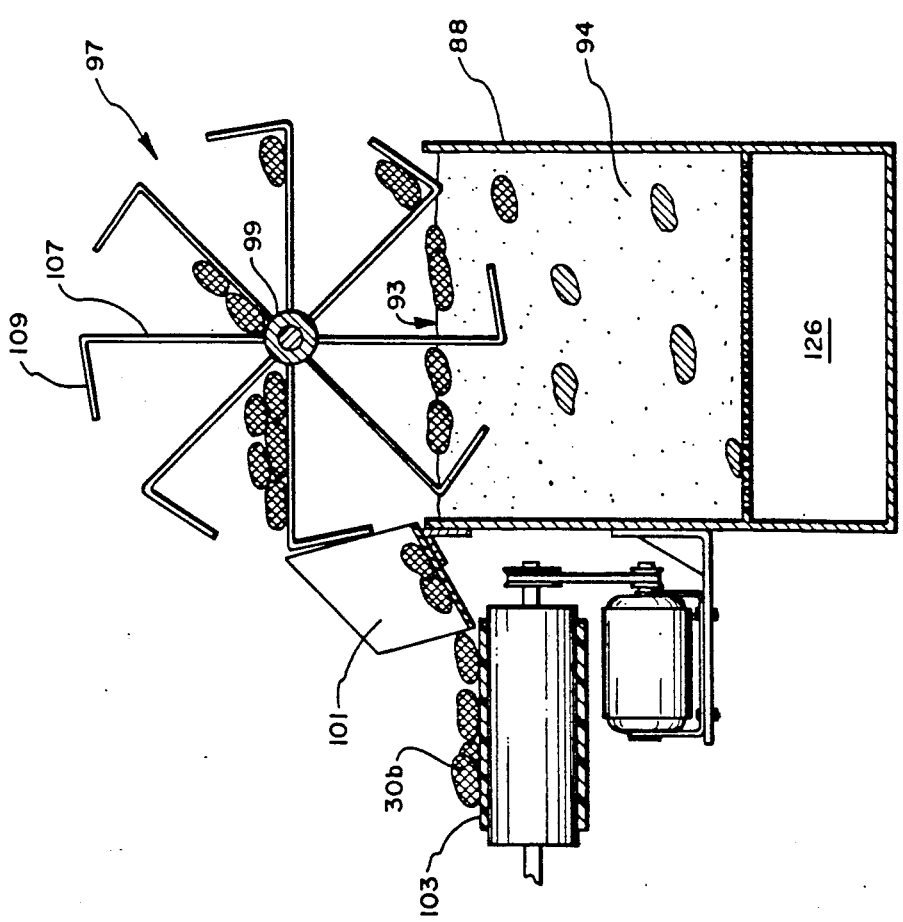
FIG. 8 is a transverse cross-sectional view of the trough of FIG. 2 taken along section line 8—8 shown therein.

Once collected, the various groups of articles 30a–30d can then be removed from the flotation stream 93 by utilization of a discharge means positioned along the length of the flotation stream at the top thereof for separate removal of each said group. In the preferred embodiment illustrated in FIG. 2, for example, a plurality of such discharge means 97 are positioned along the length of the flotation stream at points corresponding to the spacial separation of the mixture into the various groups. As shown best in FIGS. 2 and 8, each discharge means comprises a paddle wheel 99 in combination with a chute 101. Each paddle wheel 99 is comprised of a plurality of tines 107. The end of each tine is bent at an angle as illustrated at 109 and the tines 107 are spaced closely enough together so that as the paddle wheel rotates the tines 107 enter the flotation stream 93 and by means of the bent portions 109 and the associated float fraction articles 30 out of the flotation stream 93 and deposit them in the corresponding chutes 101. Chutes 101 channel the various groups of separated articles 30a–30d onto corresponding off-loading conveyors 103, as shown best in FIG. 1, which carry the separated articles for collection and off-loading into bins or conveyors 105.

Figure 9:
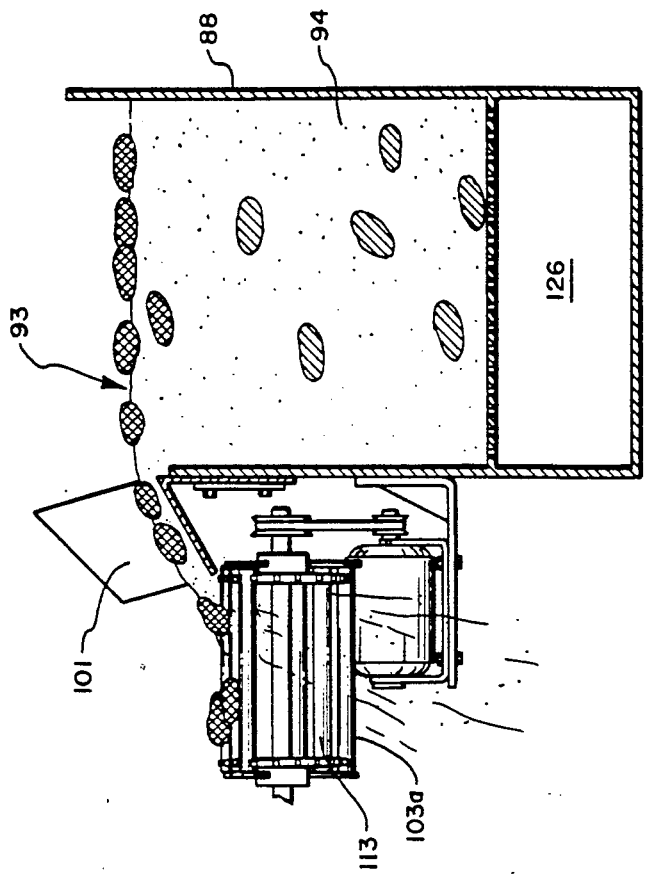
FIG. 9 is a cross-sectional view illustrating an alternative method and apparatus for discharging articles from the flotation stream once they have been separated into groups based on different densities.

An alternative method and apparatus for implementing the discharge means is illustrated in FIG. 9. As shown there, the chutes 101 are positioned so that the inlet to each chute 101 is slightly below the surface of the flotation stream 93 so as to permit drainage of the flotation stream 93 at points corresponding to the spacial separation of the various groups of separated articles 30a–30d. In this manner, the separated groups of articles are drained from the flotation stream 93 and are received onto conveyors 103a which, in accordance with this technique, are comprised of rollers 113 so as to permit the fluidization medium to separate from the discharged articles for purposes of collection and recirculation of the fluidization medium by the drum 64.

With reference to FIGS. 7 and 10 taken in combination, it should be appreciated that in accordance with the principles of the method of the present invention, the trough 88 could be designed so that it converges, as previously described in connection with the embodiment of FIG. 2, or it could be designed to be divergent and it also need not necessarily be inclined downwards, but could be horizontal while still permitting a continuous flow of the flotation stream 93 through the trough 88 by creating a pressure head for stream 93. Furthermore, flotation stream 93 need not necessarily be formed from a dry fluidization bed but could also be implemented utilizing a liquid, such as schematically illustrated in FIG. 10 by the flotation stream 93a.

In the embodiment of FIG. 10, which could be utilized either with a dry fluidized bed or a liquid stream, the channel 88a is comprised of an input end 90a which in turn comprises a chute 115 having a divider 117 which divides the chute 115 into two channels, 119 and 121. Channel 121 is used for introduction of the liquid flotation stream 93a into the channel 88a, whereas channel 119 is used for purposes of introducing the mixture 28 at the selected depth into the flotation stream at the head of the stream. The channel 119 has an outlet opening 123 through which the mixture 28 is introduced into the flotation stream. Accordingly, it will be appreciated that the apparatus and method of the invention may be adapted to a variety of differing configurations and techniques consistent with the scope of the invention as claimed.

The present invention may be embodied in other specific forms without departing from its spirit or essential characteristics, and the described embodiments are therefore to be considered in all respects only as illustrative and not restrictive. The scope of the invention is, accordingly, description, and all changes which come within the meaning and range of equivalency of the claims are to be embraced within their scope.

What is claimed is:

1. An apparatus for using a flotation stream to effect separation of a mixture of generally uniformly sized float fraction articles having small density differences into a plurality of separate groups, the apparatus comprising:
    (a) channelization means for establishing a bed through which said flotation stream continuously flows from an input end to an output end thereof, and said flotation stream being formed of a substance which comprises an essentially uniform density that is greater than the heaviest density of said articles to be separated said channelization means comprising an inclined trough and said flotation stream comprising a fluidization medium from which a fluidized bed is established, said fluidized bed continuously flowing under the influence of gravity from said input to said output end, and said apparatus further comprising a pneumatic means for forcing air upwardly through said fluidization medium to establish said fluidized bed;
    (b) mixture feed means for supplying each density group of said mixture of said articles into said input end of said channelization means at a selected depth of said flotation stream so as to cause said articles to ascend to the top of said stream as said articles are flowing with said stream, thereby effecting a spatial separation of said mixture into said plurality of groups as said articles reach the top of said stream; and
    (c) discharge means, positioned along the length of said flotation stream at the top thereof for separate removal of each said group from said flotation stream.

2. An apparatus as define din claim 1 further comprising medium recirculation means for supplying to said input end said fluidization medium, said medium recirculation means laterally encircling said output end of said channelization means so as to collect fluidization medium therefrom, and said medium recirculation means returning to said input end fluidization medium thus collected.

3. An apparatus as recited in claim 2, wherein said medium recirculation means comprises an endless sequence of transport pockets movable continuously between a load position below said output end of said channelization means and a discharge position thereabove, said transport pockets receiving fluidization medium from said channelization means in said load position and unloading fluidization medium in said discharge position.

4. An apparatus as recited in claim 3, wherein said medium recirculation means further comprises medium translation means for receiving fluidization medium unloaded from said transport pockets in said discharge position thereof and transferring said fluidization medium to said input end of said channelization means.

5. An apparatus as recited in claim 4, wherein said medium translation means comprises:
    (a) a hopper disposed above said channelization means below said discharge position of said transport pockets; and
    (b) a feed conveyor at the bottom of said hopper for moving fluidization medium therein in the direction of said input end of said channelization means.

6. An apparatus as recited in claim 5, wherein said medium translation means further comprises metering means at the end of said hopper closest to said input end of said channelization means for regulating the rate at which fluidization medium is withdrawn from said hopper and supplied to said input end of said channelization means by said feed conveyor.

7. An apparatus as recited in claim 2, wherein said medium recirculation means comprises a recirculation drum horizontally disposed and laterally encircling said output end of said channelization means for rotation about the longitudinal axis of said recirculation drum.

8. An apparatus as recited in claim 7, wherein the interior surface of said recirculation drum is provided with a continuous plurality of transport pockets for receiving fluidization medium from said channelization means below said output end thereof and, by rotation of said recirculation drum, for unloading said fluidization medium above said channelization means.

9. An apparatus as recited in claim 8, further comprising medium translation means for receiving fluidization medium unloaded from said transport pockets and transferring said fluidization medium to input end of said channelization means.

10. An apparatus as recited in claim 9, wherein said medium translation means comprises:
    (a) a hopper disposed above said channelization means within said recirculation drum; and
    (b) a feed conveyor at the bottom of said hopper for moving fluidization medium therein in the direction of said input end of said channelization means.

11. An apparatus as recited in claim 10, wherein said medium translation means further comprises metering means at the end of said hopper closest to said input end of said channelization means for regulating the rate at which fluidization medium is withdrawn from said hopper and supplied to said input end of said channelization means by said feed conveyor.

12. An apparatus as recited in claim 7, wherein said recirculation drum is supported on each side of the longitudinal axis thereof by drive wheels.

13. An apparatus as recited in claim 12, wherein said recirculation drum is retained in position supported on said drive wheels by idler wheels contacting the outer surface of said recirculation drum above and on each side of the longitudinal axis thereof.

14. An apparatus as recited in claim 12, wherein said medium recirculation means further comprises drive means for turning each of said drive wheels in a common direction to rotate said recirculation drum.

15. An apparatus as recited in claim 14, wherein said drive means comprises:

(a) a hydraulic pump; and
(b) first and second hydraulic motors connected to said hydraulic pump in parallel with each other for turning individual corresponding ones of said drive wheels.

16. An apparatus as recited in claim 1, further comprising air pretreatment means for producing from ambient air conditioned air suitable for creating the fluidized bed from said fluidization medium, said air pretreatment means supplying said conditioned air to said pneumatic means.

17. An apparatus as recited in claim 1, further comprising control means for sensing the depth of the fluidized bed and in relation thereto for controlling the rate at which said medium feed means supplies fluidization medium to said input end of said channelization means, whereby to maintain said depth of the fluidized bed at a predetermined value.

18. An apparatus as recited in claims 1 or 17, further comprising restriction means for assisting the establishment of the fluidized bed by temporarily retarding the flow of the fluidized bed at said output end of said channelization means without substantially changing the volume of said channelization means.

19. An apparatus as recited in claim 18, wherein said restriction means comprises an obstruction selectively interposable to the flow of the fluidized bed at said output end of said channelization means.

20. An apparatus as recited in claim 19, wherein said obstruction comprises a damper plate pivotally mounted at said output end of said channelization means.

21. An apparatus as recited in claim 1, wherein said mixture feed means comprises a conveyor positioned above said channelization means at said input end thereof.

22. An apparatus as recited in claim 21, further comprising means for adjusting the height of said conveyor relative to said channelization means.

23. An apparatus as recited in claim 21 wherein said input of said channelization means comprises a chute positioned beneath said conveyor so as to receive said mixture of articles as they are dropped from said conveyor, said chute having an opening at the bottom thereof through which said mixture of articles is introduced into said flotation stream.

24. An apparatus as recited in claim 23 wherein said chute comprises a divider which divides said chute into a first channel for receiving said flotation steam and a second channel for receiving said mixture of articles.

25. An apparatus as recited in claim 1 wherein said discharge means comprises a plurality of wheels positioned along the length of said channelization means at points corresponding to the spatially separated groups of articles, each said wheel comprising a plurality of tines for lifting said articles out of said flotation stream as said wheel is rotated to cause the tines to pass through the stream.

26. An apparatus as recited in claim 1 wherein said discharge means comprises a plurality of chutes into which said separated groups of articles are permitted to flow, the opening of each said chute being positioned at points along the length of said channelization means corresponding to the spatially separated groups, and the opening of each said chute being vertically positioned slightly below the surface level of said flotation stream to permit drainage into said chutes.

27. An apparatus as recited in claims 25 or 26 wherein said discharge means further comprises a plurality of off-loading conveyors for separately conveying each separated group of articles for removal from said apparatus.

28. An apparatus as recited in claims 25 or 26 wherein said channelization means comprises baffle means for assisting in collection and separation as said articles reach the top of said stream.

29. An apparatus for using a flotation stream to effect separation of a mixture of generally uniformly sized float fraction articles having small density differences into a plurality of separate groups, the apparatus comprising:
(a) channelization means for establishing a bed through which said flotation stream continuously flows from an input end to an output end thereof, and said flotation stream being formed of a substance which comprises an essentially uniform density that is greater than the heaviest density of said articles to be separated;
(b) mixture feed means for supplying each density group of said mixture of articles into said input end of said channelization means by causing said mixture to descend through said flotation stream to a selected depth of said flotation stream, such that said articles will thereafter ascend to the top of said stream as said articles are entrained and carried by said stream, thereby effecting a spatial separation of said mixture into said plurality of groups as said articles reach the top of said stream;
(c) baffle means for assisting in collection and separation of said groups as said articles reach of the top of said stream; and
(d) a plurality of discharge means, positioned along the length of aid flotation stream at the top thereof at points corresponding to the spatial separation of said mixture into said groups, for separate removal of each said group from said flotation stream.

30. An apparatus as defined in claim 29 wherein said channelization means comprises an inclined trough and wherein said flotation stream comprises a fluidization medium from which a fluidized bed is established, said fluidized bed continuously flowing under the influence of gravity from said input to said output end, and said apparatus further comprising a pneumatic means for forcing air upwardly through said fluidization medium to establish said fluidized bed.

31. An apparatus as recited in claim 30, further comprising restriction means for assisting the establishment of the fluidized bed by temporarily retarding the flow of the fluidized bed at said output end of said channelization means without substantially changing the volume of said channelization means.

32. An apparatus as recited in claim 31, wherein said restriction means comprises an obstruction selectively interposable to the flow of the fluidized bed at said output end of said channelization means.

33. An apparatus as recited in claim 32, wherein said obstruction comprises a damper plate pivotally mounted at said output end of said channelization means.

34. An apparatus as defined in claim 31 further comprising medium recirculation means for supplying to said input end said fluidization medium, said medium recirculation means laterally encircling said output end of said channelization means so as to collect fluidization medium therefrom, and said medium recirculation means returning to said input end fluidization medium thus collected.

35. An apparatus as recited in claim 34, wherein said medium recirculation means comprises a recirculation drum horizontally disposed and laterally encircling said output end of said channelization means for rotation about the longitudinal axis of said recirculation drum.

36. An apparatus as recited in claim 35, wherein the interior surface of said recirculation drum is provided with a continuous plurality of transport pockets for receiving fluidization medium from said channelization means below said output end thereof and, by rotation of said recirculation drum, for unloading said fluidization medium above said channelization means.

37. An apparatus as recited in claim 34, further comprising medium translation means for receiving fluidization medium unloaded from said transport pockets and transferring said fluidization medium to said input end of said channelization means.

38. An apparatus as recited in claim 37, wherein said medium translation means comprises:
   (a) a hopper disposed above said channelization means within said recirculation drum; and
   (b) a feed conveyor at the bottom of said hopper for moving fluidization medium therein in the direction of said input end of said channelization means.

39. An apparatus as recited in claim 38, wherein said medium translation means further comprises metering means at the end of said hopper closest to said input end of said channelization means for regulating the rate at which fluidization medium is withdrawn from said hopper and supplied to said input end of said channelization means by said feed conveyor.

40. An apparatus as recited in claim 34, wherein said recirculation drum is supported on each side of the longitudinal axis thereof by drive wheels.

41. An apparatus as recited in claim 40, wherein said recirculation drum is retained in position supported on said drive wheels by idler wheels contacting the outer surface of said recirculation drum above and on each side of the longitudinal axis thereof.

42. An apparatus as recited in claim 40, wherein said medium recirculation means further comprises drive means for turning each of aid drive wheels in a common direction to rotate said recirculation drum.

43. An apparatus as recited in claim 42, wherein said drive means comprises:
   (a) a hydraulic pump; and
   (b) first and second hydraulic motors connected to said hydraulic pump in parallel with each other for turning individual corresponding ones of said drive wheels.

44. An apparatus as recited in claim 34, further comprising air pretreatment means for producing from ambient air conditioned air suitable for creating the fluidized bed from said fluidization medium, said air pretreatment means supplying said conditioned air to said pneumatic means.

45. An apparatus as recited in claim 44, further comprising control means for sensing the depth of the fluidized bed and in relation thereto for controlling the rate at which said medium feed means supplies fluidization medium to said input end of said channelization means, whereby to maintain said depth of the fluidized bed at a predetermined value.

46. An apparatus as recited in claim 29, wherein said mixture feed means comprises a conveyor positioned above said channelization means at said input end thereof.

47. An apparatus as recited in claim 46 further comprising means for adjusting the height of said conveyor relative to said channelization means.

48. An apparatus as recited in claim 46 wherein said input of said channelization means comprises a chute positioned beneath said conveyor so as to receive said mixture of articles as they are dropped from said conveyor, said chute having an opening at the bottom thereof through which said mixture of articles is introduced into said flotation stream.

49. An apparatus as recited in claim 48 wherein said chute comprises a divider which divides said chute into a first channel for receiving said flotation stream and a second channel for receiving said mixture of articles.

50. An apparatus as recited in claim 29 wherein each said discharge means comprises a plurality of wheels positioned along the length of said channelization means at points corresponding to the spatially separated groups of articles, each said wheel comprising a plurality of tines for lifting said articles out of said flotation stream as said wheel is rotated to cause the tines to pass through the stream.

51. An apparatus as recited in claim 29 wherein each said discharge means comprises a plurality of chutes into which said separated groups of articles are permitted to flow, the opening of each said chute being positioned at points along the length of said channelization means corresponding to the spatially separated groups, and the opening of each said chute being vertically positioned slightly below the surface level of said flotation stream to permit drainage into said chutes.

52. An apparatus as recited in claims 50 or 51 further comprising a plurality of off-loading conveyors for separately conveying each separated group of articles for removal from said apparatus.

53. An apparatus for using a flotation stream to effect separation of a mixture of generally uniformly sized float fraction articles having small density differences into a plurality of separate groups, the apparatus comprising:
   (a) an inclined trough through which said flotation stream continuously flows under the influence of gravity from an input to ah output end of said trough, said floatation stream being formed from a fluidization medium and having an essentially uniform apparent density, when fluidized that is greater than the heaviest density of any of said articles;
   (b) medium recirculation means for supplying to said input end said fluidization medium from which to create said flotation stream, said medium recirculation means comprising means for collecting fluidization medium expelled at said output end and lifting and returning said expelled fluidization medium to said input end;
   (c) pneumatic means for forcing air upwardly through said fluidization medium as it flows through said trough so as to create a fluidized bed which serves as the flotation stream, said pneumatic means comprising control means for controlling the rate at which said gas is forced through said fluidization medium so as to maintain said essentially uniform apparent density;
   (d) mixture feed means for supplying each density group of said mixture of said articles having said small density differences into said input end of said channelization means at a selected depth of said flotation stream so as to cause said articles to ascend to the top of said stream as said articles are flowing with said stream, thereby effecting a spatial separation of said mixture into said as said articles reach the top of said stream; and (e) discharge means, positioned along the length of said flotation stream at the top thereof for separate removal of each said group from said flotation stream.

54. A method of using a flotation stream to effect separation of a mixture of generally uniformly sized float fraction articles having small density differences into a plurality of separate groups, the method comprising the steps of:

(a) introducing a fluidization medium into an inclined trough so that said fluidization medium can flow through said trough under the influence of gravity;

(b) forcing air upwardly through said fluidization medium as it flows through said trough so as top create a fluidized bed which serves as the flotation stream;

(c) maintaining the density of said stream at an essentially uniform value that is greater than the heaviest density of said articles in said mixture;

(d) introducing each density group of said mixture of articles into said stream at a selected depth thereof so that as said articles ascend to the top of the stream as they are flowing with the stream, the differing densities of said articles will cause the articles to reach the top of said stream at different times based on their different densities, whereby articles having different densities will be spatially separated from one another when they reach the top of said stream;

(e) grouping articles having essentially the same density into separate groups; and (f) separately discharging the grouped articles to effect removal from said stream and collection of said groups of articles.

55. A method as defined in claim 54 further comprising the step of increasing said spatial separation by increasing the velocity at which said stream is flowing.

56. A method as defined in claim 54 further comprising the step of increasing said spatial separation by increasing the depth at which each said group of said mixture is introduced into said stream.

* * * * *